(No Model.)

E. H. RINGER.
NUT LOCK.

No. 293,085.　　　　　Patented Feb. 5, 1884.

WITNESSES:
R. Jones
N. Kirk

INVENTOR:
Edward H. Ringer
By J. L. Zerbe
Attorney.

UNITED STATES PATENT OFFICE.

EDWARD H. RINGER, OF BRADENVILLE, PENNSYLVANIA.

NUT-LOCK.

SPECIFICATION forming part of Letters Patent No. 293,085, dated February 5, 1884.

Application filed July 18, 1883. (No model.)

*To all whom it may concern:*

Be it known that I, EDWARD H. RINGER, of Bradenville, in the county of Westmoreland and State of Pennsylvania, have invented a new and useful Improvement in Nut-Locks, which improvement is fully set forth in the following specification and accompanying drawings, in which—

Figure 1:
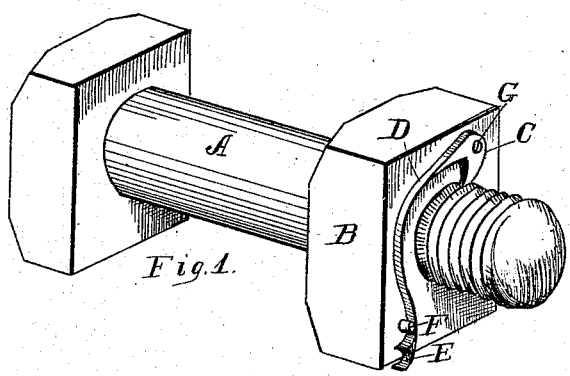
Figure 2:
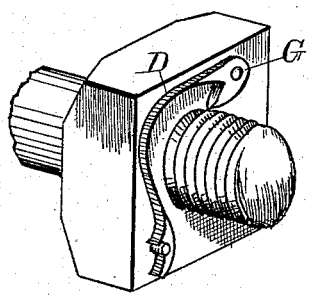

Figure 1 is a perspective view of a bolt with my improved nut-lock. Fig. 2 is a perspective view of a section of same with the pawl disengaged from the same.

This invention consists in a pawl pivoted on a nut having a flexible arm or spring so arranged that it can be engaged and disengaged with the thread of the bolt, and thus effectually prevent the nut from turning off the bolt.

In the drawings, A is an ordinary bolt, and B the nut. A pawl, C, of such a size and shape that the point fits into the angle of the thread, is pivoted on the outer face of the nut. This pawl is at such an angle relative to the thread that when engaged with it allows the nut to turn onto the bolt, but on being reversed immediately binds into the bolt. The pawl C is provided with an independent arm or spring, D, extending around on the outer face of the nut. The outer end of the arm is provided with a recess or indent, into which a stud, F, secured to the face of the nut, rests. The pivot or screw to which the pawl is attached, and the stud, which fits into the indent of the arm, are arranged on opposite diagonal corners of the nut. This gives a semicircular direction to the arm. The end of the arm containing the indent is on the inside of the stud F, and when disengaged its extensile quality throws the arm forward, and engages the pawl with the thread of the bolt, as in Fig. 1. When the end of the arm or spring is pressed, as in Fig. 2, so as to allow the indent to engage with the stud, the outward curve of the arm releases the pawl, and allows the nut to turn freely on the bolt.

As will be seen, the simplicity of this device is very apparent. The extensile quality of the arm or spring at all times allows the pawl to engage with the bolt. When it is desired to remove the nut, by pressing upon the end of the arm the indent engages with the stud, and permits of the nut being removed without difficulty.

What I claim is—

1. In a nut-lock, a pawl having a curved flexible arm or spring provided at one end with an indent or recess, as and for the purpose herein set forth.

2. In a nut-lock, a pawl having a curved flexible arm or spring provided at one end with an indent or recess, in combination with a nut, as and for the purpose herein set forth.

3. In a nut-lock, a nut having on the face thereof a stud, and a pawl having a curved flexible arm or spring provided at one end with an indent to engage with the stud, in combination with the bolt, as and for the purpose herein set forth.

In testimony that I claim the foregoing I have hereunto set my hand this 6th day of July, 1883, in the presence of witnesses.

EDWARD H. RINGER.

Witnesses:
 A. J. SENBERT,
 W. A. JAMISON.